US012288524B2

(12) United States Patent
Heo et al.

(10) Patent No.: US 12,288,524 B2
(45) Date of Patent: Apr. 29, 2025

(54) PIXEL CIRCUIT AND DISPLAY DEVICE INCLUDING THE SAME

(71) Applicant: LG Display Co., Ltd., Seoul (KR)

(72) Inventors: Seung Ho Heo, Paju-si (KR); Dong Hyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/489,595

(22) Filed: Oct. 18, 2023

(65) Prior Publication Data

US 2024/0257757 A1 Aug. 1, 2024

(30) Foreign Application Priority Data

Jan. 27, 2023 (KR) ........................ 10-2023-0010512

(51) Int. Cl.
*G09G 3/3258* (2016.01)
*G09G 3/3241* (2016.01)

(52) U.S. Cl.
CPC ......... *G09G 3/3258* (2013.01); *G09G 3/3241* (2013.01); *G09G 2230/00* (2013.01); *G09G 2300/0426* (2013.01); *G09G 2300/043* (2013.01); *G09G 2300/0871* (2013.01)

(58) Field of Classification Search
CPC .. G09G 3/3233; G09G 3/3241; G09G 3/3258; G09G 3/3266; G09G 2230/00; G09G 2300/0426; G09G 2300/043; G09G 2300/0833; G09G 2300/0842; G09G 2300/0871; G09G 2310/08; G09G 2320/0626; G09G 2330/021; G09G 3/30; G09G 2300/0819; G09G 2300/0852; G09G 2300/0861; G09G 2310/0262; G09G 2320/0233; G09G 2320/043
See application file for complete search history.

(56) References Cited

U.S. PATENT DOCUMENTS

| | | | | |
|---|---|---|---|---|
| 9,349,324 B2 * | 5/2016 | Chang | G09G 3/3233 | |
| 2011/0164018 A1 * | 7/2011 | Kang | G09G 3/3233 | 345/76 |
| 2017/0352316 A1 * | 12/2017 | Zhang | G09G 3/3233 | |
| 2021/0248961 A1 * | 8/2021 | Yang | G09G 3/3233 | |

FOREIGN PATENT DOCUMENTS

KR 20190134105 A 12/2019

* cited by examiner

*Primary Examiner* — Nelson M Rosario
(74) *Attorney, Agent, or Firm* — Seed IP Law Group LLP

(57) ABSTRACT

Disclosed is a pixel circuit and a display device including the pixel circuit. The pixel circuit includes: a driving element; a light emitting element; a first capacitor connected between a second node and a fourth node; a second capacitor connected between a third node and the fourth node; a first switch element connected between the second node and a data line; a second switch element connected between the fourth node and a third voltage node; a third switch element connected between the third node and a fourth voltage node; a fourth switch element connected between the second node and the third voltage node; and a fifth switch element connected between the third node and an anode electrode of a light emitting element. In various embodiments, one or more the second third, fourth.

20 Claims, 15 Drawing Sheets

PIXEL CIRCUIT AND DISPLAY DEVICE INCLUDING THE SAME

CROSS-REFERENCE TO RELATED APPLICATION

This application claims priority to and the benefit of Korean Patent Application No. 10-2023-0010512, filed Jan. 27, 2023, the disclosure of which is incorporated herein by reference in its entirety.

BACKGROUND

Technical Field

The present disclosure relates to a pixel circuit and a display device including the pixel circuit.

Description of the Related Art

An organic light-emitting display device an includes an organic light-emitting diode (hereinafter referred to as "OLED") which emits light by itself, and has an advantage that its response speed is fast and its luminous efficiency, luminance, and viewing angle are large. The organic light-emitting display device has a fast response speed, excellent luminous efficiency, luminance, and viewing angle, and has excellent contrast ratio and color reproducibility since it can express black grayscales in full black.

The organic light-emitting display device does not require a backlight unit, and may be implemented on a plastic substrate, a thin glass substrate, or a metal substrate, which are a flexible material. Accordingly, flexible displays may be implemented with organic light-emitting display devices.

Each of the pixels of an organic light-emitting display device includes a driving element for driving the OLED. The pixel circuit may sense a threshold voltage of the driving element to compensate for variations in the threshold voltage according to the accumulation of driving time of the pixels by using an internal compensation circuit. The internal compensation circuit may sense the threshold voltage of the driving element by using a source-follower compensation circuit or a diode-connection compensation circuit.

BRIEF SUMMARY

The inventors have realized that when a source-follower compensation circuit is used, data transmission loss may occur when the data voltage is charged, depending on the size of the capacitors in the pixel circuit. The present disclosure has been made in an effort to address aforementioned drawbacks.

The present disclosure provides a pixel circuit that is capable of sensing a threshold voltage of a driving element by using a source-follower compensation circuit, and preventing data transmission loss and a display device including the pixel circuit.

It should be noted that objects of the present disclosure are not limited to the above-described objects, and other objects of the present disclosure will be apparent to those skilled in the art from the following descriptions.

A pixel circuit according to one embodiment of the present disclosure includes: a driving element including a first electrode to which a pixel driving voltage is applied, a gate electrode connected to a second node, and a second electrode connected to a third node; a light emitting element including an anode electrode and a cathode electrode connected to a second constant voltage node to which a cathode voltage is applied; a first capacitor connected between the second node and a fourth node; a second capacitor connected between the third node and the fourth node; a first switch element connected between the second node and a data line to which a data voltage is applied; a second switch element connected between the fourth node and a third constant voltage node to which a reference voltage is applied; a third switch element connected between the third node and a fourth constant voltage node to which an initialization voltage is applied; a fourth switch element connected between the second node and the third constant voltage node; and a fifth switch element connected between the third node and the anode electrode of the light emitting element.

The pixel driving voltage may be higher than the cathode voltage. The reference voltage may be lower than the pixel driving voltage and higher than the cathode voltage. The initialization voltage may be lower than the cathode voltage.

The first switch element may connect the data line to the second node in response to a first scan signal. The second switch element may connect the third constant voltage node to the fourth node in response to a second scan signal. The third switch element may connect the fourth constant voltage node to the third node in response to a third scan signal. The fourth switch element may connect the third constant voltage node to the second node in response to a fourth scan signal. The fifth switch element may connect the third node to the anode electrode of the light emitting element in response to an emission control signal.

The first switch element may include a gate electrode connected to a first gate line to which the first scan signal is applied, a first electrode connected to the data line, and a second electrode connected to the second node. The second switch element may include a gate electrode connected to a second gate line to which the second scan signal is applied, a first electrode connected to the third constant voltage node, and a second electrode connected to the fourth node. The third switch element may include a gate electrode connected to a third gate line to which the third scan signal is applied, a first electrode connected to the fourth constant voltage node, and a second electrode connected to the third node. The fourth switch element may include a gate electrode connected to a fourth gate line to which the fourth scan signal is applied, a first electrode connected to the third constant voltage node, and a second electrode connected to the second node. The fifth switch element may include a gate electrode connected to a fifth gate line to which the emission control signal is applied, a first electrode connected to the third node, and a second electrode connected to the anode electrode of the light emitting element.

The pixel circuit may be driven in the order of an initialization period, a sensing period, a data writing period, and a light emission period. A voltage of the first scan signal may be a gate-on voltage during the data writing period, and a gate-off voltage during the initialization period, the sensing period, and the light emission period. A voltage of the second scan signal may be the gate-on voltage during the initialization period, the sensing period, and the data writing period, and the gate-off voltage during the light emission period. A voltage of the third scan signal may be the gate-on voltage during the initialization period and the gate-off voltage during the sensing period, the data writing period, and the light emission period. A voltage of the fourth scan signal may be the gate-on voltage during the initialization period and the sensing period, and the gate-off voltage during the data writing period and the light emission period.

A voltage of the emission control signal may be the gate-on voltage during the initialization period and the light emission period, and the gate-off voltage during the sensing period and the data writing period. Each of the first to fifth switch elements may be turned on in response to the gate-on voltage and turned off in response to the gate-off voltage.

During the initialization period, the second to fifth switch elements may be in the ON state and the first switch element may be in the OFF state. During the sensing period, the second and fourth switch elements may be in the ON state and the first, third, and fifth switch elements may be in the OFF state. During the data writing period, the first and second switch elements may be in the ON state and the third, fourth, and fifth switch elements may be in the OFF state. During the light emitting period, the fifth switch element may be in the ON state and the first to fourth switch elements may be in the OFF state.

The pixel circuit may further include a sixth switch element configured to connect the pixel driving voltage to a first node in response to a second emission control signal. The first electrode of the driving element may be connected to the first node.

The sixth switch element may include a gate electrode connected to a sixth gate line to which the second emission control signal is applied, a first electrode connected to a first constant voltage node to which the pixel driving voltage is applied, and a second electrode connected to the first node.

The pixel circuit may be driven in the order of an initialization period, a sensing period, a data writing period, and a light emission period. A voltage of the first scan signal may be a gate-on voltage during the data writing period, and a gate-off voltage during the initialization period, the sensing period, and the light emission period. A voltage of the second scan signal may be the gate-on voltage during the initialization period, the sensing period, and the data writing period, and the gate-off voltage during the light emission period. A voltage of the third scan signal may be the gate-on voltage during the initialization period and the gate-off voltage during the sensing period, the data writing period, and the light emission period. A voltage of the fourth scan signal may be the gate-on voltage during the initialization period and the sensing period, and the gate-off voltage during the data writing period and the light emission period. A voltage of the emission control signal may be the gate-on voltage during the initialization period and the light emission period, and the gate-off voltage during the sensing period and the data writing period. A voltage of the second emission control signal may be the gate-on voltage during the initialization period, the sensing period, and the light emission period, and the gate-off voltage during the data writing period. Each of the first to sixth switch elements may be turned on in response to the gate-on voltage, and turned off in response to the gate-off voltage.

During the initialization period, the second to sixth switch elements may be in the ON state and the first switch element may be in the OFF state. During the sensing period, the second, fourth, and sixth switch elements may be in the ON state and the first, third, and fifth switch elements may be in the OFF state. During the data writing period, the first and second switch elements may be in the ON state and the third, fourth, fifth, and sixth switch elements may be in the OFF state. During the light emission period, the fifth and sixth switch elements may be in the ON state and the first to fourth switch elements may be in the OFF state.

A display device according to one embodiment of the present disclosure includes: a display panel in which a plurality of data lines, a plurality of gate lines, a plurality of power lines, and a plurality of sub-pixels are disposed; a gate driver configured to supply gate signals to the gate lines; and a data driver configured to supply a data voltage of pixel data to the data lines. The gate signals includes: a first scan signal, a second scan signal, a third scan signal, a fourth scan signal, and an emission control signal. Each of the sub-pixels includes: a driving element including a first electrode to which a pixel driving voltage is applied, a gate electrode connected to a second node, and a second electrode connected to a third node; a light emitting element including an anode electrode and a cathode electrode connected to a second constant voltage node to which a cathode voltage cathode voltage is applied; a first capacitor connected between the second node and a fourth node; a second capacitor connected between the third node and the fourth node; a first switch element connected between the second node and the data line to which the data voltage is applied; a second switch element connected between the fourth node and a third constant voltage node to which a reference voltage is applied; a third switch element connected between the third node and a fourth constant voltage node to which an initialization voltage is applied; a fourth switch element connected between the second node and the third constant voltage node; and a fifth switch element connected between the third node and the anode electrode of the light emitting element. The first switch element may connect the data line to the second node in response to a first scan signal. The second switch element may connect the third constant voltage node to the fourth node in response to a second scan signal. The third switch element may connect the fourth constant voltage node to the third node in response to a third scan signal. The fourth switch element may connect the third constant voltage node to the second node in response to a fourth scan signal. The fifth switch element may connect the third node to the anode electrode of the light emitting element in response to an emission control signal. Each of the sub-pixels may be driven in the order of an initialization period, a sensing period, a data writing period, and a light emission period. A voltage of the first scan signal may be a gate-on voltage during the data writing period, and a gate-off voltage during the initialization period, the sensing period, and the light emission period. A voltage of the second scan signal may be the gate-on voltage during the initialization period, the sensing period, and the data writing period, and the gate-off voltage during the light emission period. A voltage of the third scan signal may be the gate-on voltage during the initialization period and the gate-off voltage during the sensing period, the data writing period, and the light emission period. A voltage of the fourth scan signal may be the gate-on voltage during the initialization period and the sensing period, and the gate-off voltage during the data writing period and the light emission period. A voltage of the emission control signal may be the gate-on voltage during the initialization period and the light emission period, and the gate-off voltage during the sensing period and the data writing period. Each of the first to fifth switch elements may be turned on in response to the gate-on voltage and turned off in response to the gate-off voltage. Each of the sub-pixels may further include a sixth switch element configured to connect the pixel driving voltage to a first node in response to a second emission control signal. The first electrode of the driving element may be connected to the first node. Each of the sub-pixels may be driven in the order of an initialization period, a sensing period, a data writing period, and a light emission period. A voltage of the first scan signal may be a gate-on voltage during the data writing period, and a gate-off voltage during the initialization period, the sensing period, and the light emission period. A voltage of the second scan signal may be the gate-on voltage during the initialization period, the sensing period, and the data writing period, and the gate-off voltage during the light emission period. A voltage of the third scan signal may be the gate-on voltage during the initialization period and the gate-off voltage during the sensing period, the data writing period, and the light emission period. A voltage of the fourth scan signal may be the gate-on voltage during the initialization period and the sensing period, and the gate-off voltage during the data writing period and the light emission period. A voltage of the emission control signal may be the gate-on voltage during the initialization period and the light emission period, and the gate-off voltage during the sensing period and the data writing period. A voltage of the second emission control signal may be the gate-on voltage during the initialization period, the sensing period, and the light emission period, and the gate-off voltage during the data writing period. Each of the first to sixth switch elements may be turned on in response to the gate-on voltage, and turned off in response to the gate-off voltage. During the data writing period, the second node may be applied with the data voltage and the fourth node may be applied with the reference voltage.

According to the present disclosure, the pixel circuit may be driven without the transmission loss of the data voltage by connecting the first and second capacitors between the gate electrode and the source electrode of the driving element.

According to the present disclosure, since the transmission loss of the data voltage may be avoided, the luminance of the pixels may be prevented from decreasing without increasing the data voltage, thereby enabling a low-power driving of the display device.

Effects which can be achieved by the present disclosure are not limited to the above-mentioned effects. That is, other effects that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
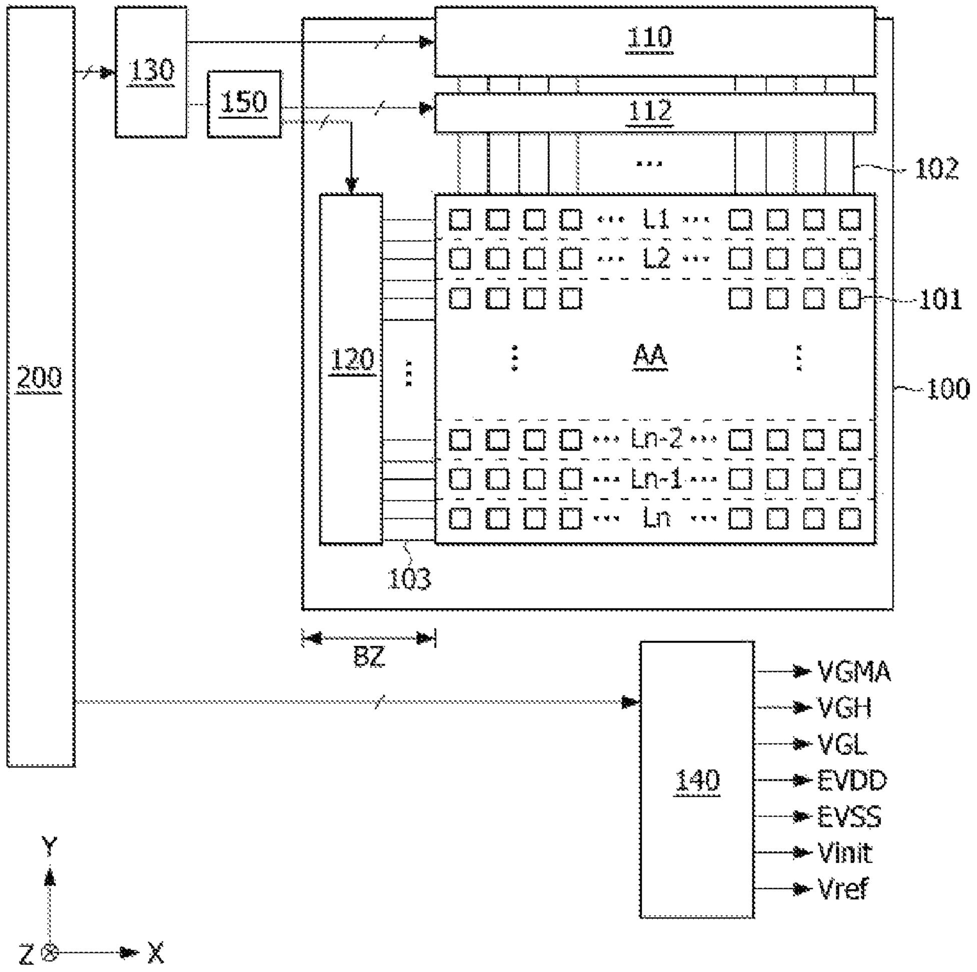
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “consist of” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In a display device of the present disclosure, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In case of an n-channel transistor, a gate-on voltage may be a gate high voltage VGH, and a gate-off voltage may be a gate low voltage VGL. In case of a p-channel transistor, a gate-on voltage may be a gate low voltage VGL, and a gate-off voltage may be a gate high voltage VGH.

Hereinafter, various embodiments of the present disclosure will be described in detail with reference to the accompanying drawings.

Figure 2:
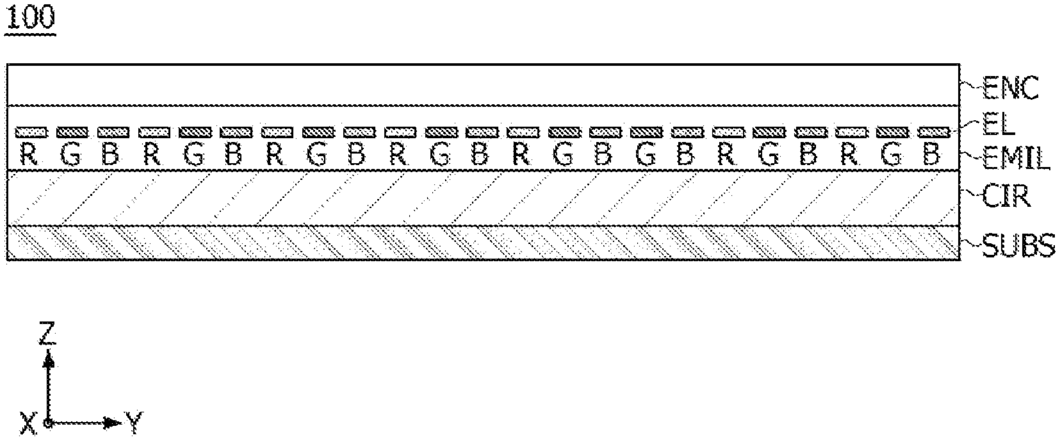
FIG. 2 is a cross-sectional view illustrating a cross-sectional structure of the display panel shown in FIG. 1.

FIG. 1 is a block diagram illustrating a display device according to one embodiment of the present disclosure. FIG. 2 is a cross-sectional view illustrating a cross-sectional structure of the display panel shown in FIG. 1.

Referring to FIGS. 1 to 2, the display device according to an embodiment of the present disclosure includes a display panel 100, a display panel driving circuit for writing pixel data to pixels of the display panel 100, and a power supply 140 for generating power for driving the pixels and the display panel driving circuit.

The display panel 100 may be a panel having a rectangular structure with a length in the X-axis direction, a width in the Y-axis direction, and a thickness in the Z-axis direction. A display area AA on the display panel 100 includes a pixel array for displaying an input image thereon. The pixel array includes a plurality of data lines 102, a plurality of gate lines 103 intersecting the data lines 102, and pixels 101 arranged in a matrix form. The display panel 100 may further include power lines commonly connected to the pixels 101. The power lines are connected to constant voltage nodes of the pixel circuits and supply a constant voltage for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light-emitting element. Each of the pixel circuits is connected to data lines, gate lines, and power lines.

The pixels may be disposed as real color pixels and pentile pixels. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The pixel array includes a plurality of pixel lines L1 to Ln. Each of the pixel lines L1 to Ln includes one line of pixels arranged along the line direction (X-axis direction) in the pixel array of the display panel 100. Sub-pixels arranged in one pixel line share the gate lines 103. Sub-pixels arranged in the column direction Y along a data line direction share the same data line 102. One horizontal period is a time obtained by dividing one frame period by the total number of the pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer.

The light-emitting element layer EMIL may include a light-emitting element EL driven by the pixel circuit. The light-emitting element EL may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power circuit 140 generates a DC voltage (or a constant voltage) for driving the pixel array of the display panel 100 and the display panel driving circuit using a DC-DC converter. The DC-DC converter may include a charge pump, a regulator, a buck converter, a boost converter, and the like. The power circuit 140 may adjust the level of a DC input voltage applied from the host system 200 to generate constant voltage such as a gamma reference voltage VGMA, a gate-on voltage VGH, a gate-off voltage VGL, a pixel driving voltage EVDD, a cathode voltage EVSS, an initialization voltage Vinit, a reference voltage Vref, and the like. The gamma reference voltage VGMA is supplied to the data driver 110. The dynamic range of the data voltage outputted from the data driver 110 is determined by the voltage range of the gamma reference voltage. The dynamic range of the data voltage is a voltage range between the highest grayscale voltage and the lowest grayscale voltage, and the voltage level is selected by the grayscale value of the pixel data. The voltage level outputted from the power circuit 140 may be adjusted under the control of a control circuit such as the host system 200 or the timing controller 130. Hereinafter, the control circuit may be interpreted as the host system 200 and/or the timing controller 130.

A gate high voltage VGH and a gate low voltage VGL are supplied to a level shifter 150 and a gate driver 120. Constant voltages such as a pixel driving voltage EVDD, a cathode voltage EVSS, an initialization voltage Vinit, and a reference voltage Vref are supplied to the pixels 101 via the power lines commonly connected to the pixels 101.

The pixel driving voltage EVDD may be outputted from a main power source of the host system 200 and supplied to the display panel 100. In this case, the pixel driving voltage EVDD does not need to be outputted from the power circuit 140.

The display panel driving circuit writes pixel data of an input image to the pixels of the display panel 100 under the control of the timing controller 130. The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. The de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 1. The data driver 110 and the touch sensor driver may be integrated into one drive IC (Integrated Circuit). In a mobile terminal or a wearable terminal, the timing controller 130, the level shifter 150, the data driver 110, the touch sensor driver, and the like may be integrated into one drive IC (DIC).

The data driver 110 receives the pixel data of the input image received as a digital signal from the timing controller 130 and outputs the data voltage. The data driver 110 outputs the data voltage by converting the pixel data of the input image into a gamma compensation voltage using a digital-to-analog converter (DAC). The gamma reference voltage VGMA is divided into a gamma compensation voltage for each grayscale by a voltage divider circuit in the data driver 110, which is supplied to the DAC. The DAC generates data voltages as gamma compensation voltages corresponding to the grayscale values of the pixel data. The data voltages outputted from the DAC may be output to the data line 102 through output buffers in respective channels of the data drive 110, or may be outputted to the data line 102 through the de-multiplexer array 112.

The gate driver 120 may be formed in the circuit layer CIR on the display panel 100 together with the TFT array of the pixel array and wirings. The gate driver 120 may be disposed in a non-display area BZ outside the display area AA in the display panel 100, or at least a portion thereof may be disposed in the display area AA.

The gate driver 120 may include a plurality of shift registers for sequentially shifting pulses of the gate signals. The gate driver 120 may be disposed on one side of the left non-display area BZ and the right non-display area BZ outside the display area AA in the display panel 100 to supply the gate signals to the gate lines 103 in a single feeding method. In the single feeding method, the gate signals are applied at one ends of the gate lines 103. The gate driver 120 may be disposed on the left non-display area BZ and the right non-display area BZ of the display panel 100 to apply the gate signals to the gate lines 103 in a double feeding method. In the double feeding method, the gate signals are applied simultaneously to opposite ends of the gate lines 103.

The gate driver 120 sequentially outputs pulses of the gate signals to the gate lines 103 under the control of the timing controller 130. The gate driver 120 may sequentially supply the gate signals to the gate lines 103 by shifting the pulses of the gate signals using the shift registers. The gate driver 120 may utilize a plurality of shift registers to output a plurality of gate signals having different phases, pulse widths, etc. The gate signals outputted from the gate driver 120 include a scan signal and an emission control signal (hereinafter referred to as "EM pulse").

The timing controller 130 receives from the host system 200 digital video data of the input image and timing signals synchronized with this data. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The data enable signal DE has a cycle of one horizontal period (1H).

The timing controller 130 generates a data timing control signal for controlling the operation timing of the data driver 110, a MUX control signal for controlling the operation timing of the de-multiplexer array 112, and a gate timing control signal for controlling the operation timing of the gate driver 120 based on the timing signals Vsync, Hsync, and DE received from the host system 200. The timing controller 130 synchronizes the data driver 110, the de-multiplexer array 112, the touch sensor driver, and the gate driver 120 by controlling the operation timing of the display panel driving circuit.

The gate timing control signal generated from the timing controller 130 may be inputted to the shift registers in the gate driver 120 through the level shifter 150. The level shifter 150 may receive the gate timing control signal and generate a start pulse and a shift clock to provide them to the gate driver 120. The level shifter 150 may supply the MUX control signal to the de-multiplexer array 112. An input signal to the level shifter 150 may be a digital voltage signal, and an output signal from the level shifter 150 may be an analog voltage signal that swings between a gate-on voltage VGH and a gate-off voltage VGL.

The host system 200 may include a main board of any of a television system, a set-top box, a navigation system, a personal computer (PC), an in-vehicle system, a mobile terminal, or a wearable terminal. The host system may scale an image signal from a video source to match the resolution of the display panel 100, and may transmit it to the timing controller 130 together with the timing signal.

Each of the sub-pixels includes a pixel circuit including a driving element for driving the light emitting element and a capacitor connected to the driving element. The pixel circuit of each of the sub-pixels may include an internal compensation circuit to compensate the data voltage by a threshold voltage of the driving element.

Figure 3:
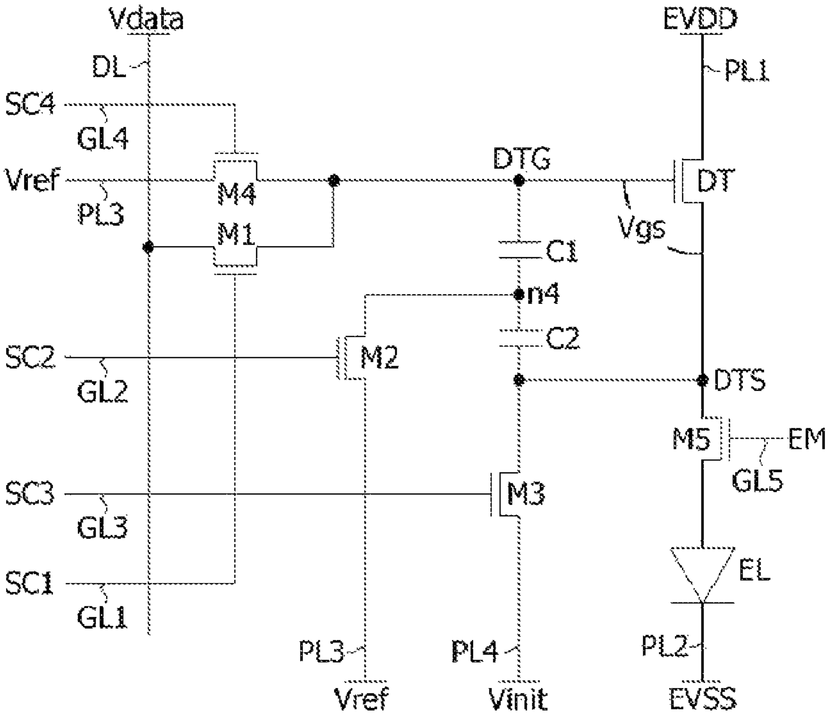
FIG. 3 is a circuit diagram illustrating a pixel circuit according to one embodiment of the present disclosure.
Figure 4:
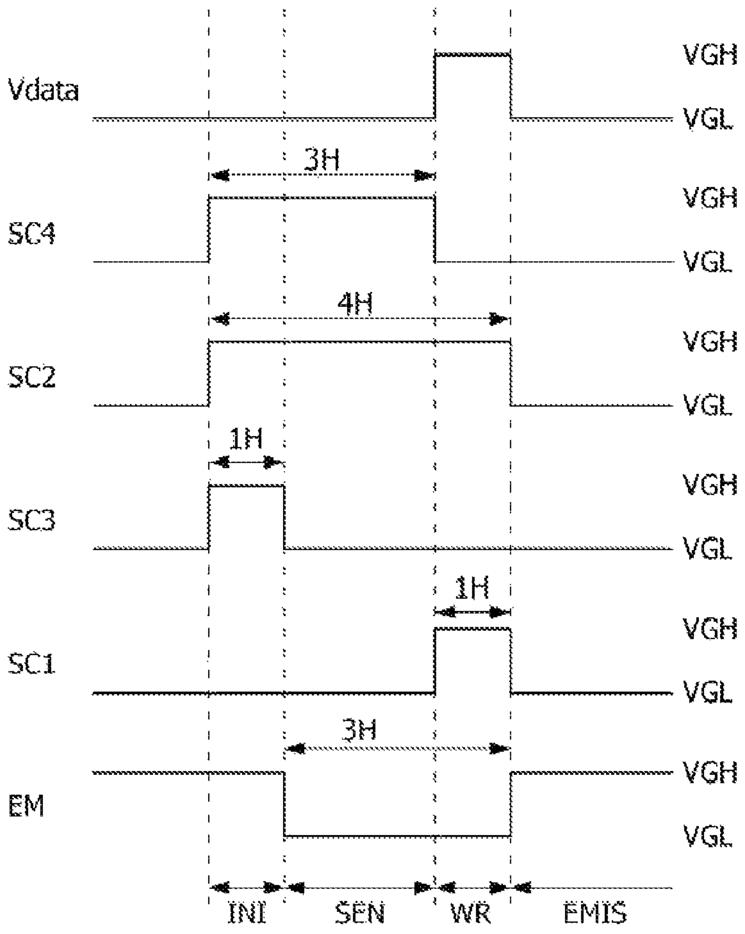
FIG. 4 is a waveform diagram illustrating gate signals applied to the pixel circuit shown in FIG. 3.

FIG. 3 is a circuit diagram illustrating a pixel circuit according to one embodiment of the present disclosure. FIG. 4 is a waveform diagram illustrating gate signals applied to the pixel circuit shown in FIG. 3.

Referring to FIGS. 3 and 4, the pixel circuit includes an emitting element EL, a driving element DT driving the emitting element EL, a plurality of switch elements M1 to M5, a first capacitor C1, and a second capacitor C2. The driving element DT and each of the switch elements M1 to M5 may be implemented as n-channel oxide TFTs.

The pixel circuit is connected to a data line DL to which a data voltage Vdata of pixel data is applied, and to gate lines GL1 to GL5 to which gate signals SC1 to SC4, and EM are applied.

The pixel circuit is connected to power nodes to which a constant voltage is applied, such as a first constant voltage node PL1 to which a pixel driving voltage EVDD is applied, a second constant voltage node PL2 to which a cathode voltage EVSS is applied, a third constant voltage node PL3 to which a reference voltage Vref is applied, and a fourth constant voltage node PL4 to which an initialization voltage Vinit is applied. On the display panel 100, power lines to which the constant voltage nodes are connected may be commonly connected to all pixels.

The pixel driving voltage EVDD and the cathode voltage EVSS are set to a voltage that allows the driving element DT to operate in a saturation region. The reference voltage Vref may be set to a voltage lower than the pixel driving voltage EVDD and higher than the cathode voltage EVSS. The reference voltage Vref may be a voltage that is higher than the lowest grayscale voltage or black grayscale voltage in a dynamic range of the data voltage. The initialization voltage Vinit may be set to a voltage lower than the cathode voltage EVSS. A gate-on voltage VGH may be set to a voltage higher than the pixel driving voltage EVDD, and a gate-off voltages VGL may be set to a voltage lower than the cathode voltage EVSS. For example, the constant voltage may be set to, but not limited to, EVDD=12.0[V], EVSS=−2.0[V], Vref=1.0[V], Vinit=−3.0[V], VGH=15.0[V], VGL=−10.0 [V].

The gate signals SC1 to SC4 and EM include pulses that swing between the gate-on voltage VGH and the gate-off voltage VGL. For the pixel circuit shown in FIG. 3, the gate driver 120 may include a first shift register that outputs a first scan signal SC1, a second shift register that outputs a second scan signal SC2, a third shift register that outputs a third scan signal SC3, a fourth shift register that outputs a fourth scan signal SC4, and a fifth shift register that outputs an EM signal EM.

The driving element DT generates a current according to a gate-source voltage Vgs to drive the light emitting element EL. The driving element DT includes a first electrode connected to the first constant voltage node to which the pixel driving voltage EVDD is applied, a gate electrode connected to a second node DTG, and a second electrode connected to a third node DTS.

The light emitting element EL may be implemented as an OLED. The light emitting element EL includes an anode electrode, a cathode electrode, and an organic compound layer interposed between these electrodes. The anode electrode of the light emitting element EL is connected to a second electrode of a fifth switch element M5, and the cathode electrode thereof is connected to the second constant voltage node PL2 to which the cathode voltage EVSS is applied. The organic compound layer may include, but is not limited to, a hole injection layer (HIL), a hole transport layer (HTL), an light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the light emission layer EML. The light emitting element EL may be implemented as an OLED having a tandem structure with multiple light emitting layers stacked on top of each other. The OLED having the tandem structure may improve the luminance and lifespan of the pixels.

The first capacitor C1 is connected between the second node DTG and a fourth node n4. The second capacitor C2 is connected between the third node DTS and the fourth node n4. The first and second capacitors C1 and C2 are connected in series between the second node DTG and the third node DTS and have a combined capacity of (C1*C2)/(C1+C2). The first and second capacitors C1 and C2 may have the same capacity or different capacities.

A first switch element M1 is connected between the second node DTG and the data line DL to which the data voltage Vdata of the pixel data is applied. The first switch element M1 is turned on in response to the gate-on voltage VGH of the first scan signal SC1 to connect the data line DL to the second node DTG. The first switch element M1 includes a gate electrode connected to a first gate line GL1 to which the first scan signal SC1 is applied, a first electrode connected to the data line DL, and a second electrode connected to the second node DTG.

A second switch element M2 is connected between the fourth node n4 and the third constant voltage node PL3 to which the reference voltage Vref is applied. The second switch element M2 is turned on in response to the gate-on voltage VGH of the second scan signal SC2 to connect the third constant voltage node PL3 to the fourth node n4. The second switch element M2 includes a gate electrode connected to a second gate line GL2 to which the second scan signal SC2 is applied, a first electrode connected to the third constant voltage node PL3, and a second electrode connected to the fourth node n4.

A third switch element M3 is connected between the third node DTS and the fourth constant voltage node PL4 to which the initialization voltage Vinit is applied. The third switch element M3 is turned on in response to the gate-on voltage VGH of the third scan signal SC3 to connect the fourth constant voltage node PL4 to the third node DTS. The third switch element M3 includes a gate electrode connected to a third gate line GL3 to which the third scan signal SC3 is applied, a first electrode connected to the fourth constant voltage node PL4, and a second electrode connected to the third node DTS.

A fourth switch element M4 is connected between the second node DTG and the third constant voltage node PL3 to which the reference voltage Vref is applied. The fourth switch element M4 is turned on in response to the gate-on voltage VGH of the fourth scan signal SC4 to connect the third constant voltage node PL3 to the second node DTG. The fourth switch element M4 includes a gate electrode connected to a fourth gate line GL4 to which the fourth scan signal SC4 is applied, a first electrode connected to the third constant voltage node PL3, and a second electrode connected to the second node DTG.

A fifth switch element M5 is connected between the third node DTS and the anode electrode of the light emitting element EL. The fifth switch element M5 is turned on in response to a gate-on voltage VGH of the EM signal EM to connect the third node DTS to the anode electrode of the light emitting element EL. The fifth switch element M5 includes a gate electrode connected to a fifth gate line GL5 to which the EM signal EM is applied, a first electrode connected to the third node DTS, and a second electrode connected to the anode electrode of the light emitting element EL.

A driving period of the pixel circuit includes an initialization period INI during which the pixel circuit is initialized, a sensing period SEN during which a threshold voltage Vth of the driving element DT is sensed and stored in the capacitors C1 and C2, a data writing period WR during which the pixel data is written, and a light emission period EMIS during which the light emitting element EL is emitted, as shown in FIG. 4.

A duration of each of the initialization period INI, the sensing period SEN, the data writing period WR, and the light emission period EMIS may be determined by waveforms of the gate signals SC1 to SC4 and EM.

Each of the first to fourth scan signals SC1 to SC4 includes a pulse of the gate-on voltage VGH. The pulse of the first scan signal SC1 is generated with a pulse width of one horizontal period (1H) during the data writing period WR. The pulse of the second scan signal SC2 is generated with a pulse width of four horizontal periods (4H) during the initialization period INI to the data writing period WR. The pulse of the third scan signal SC3 is generated with a pulse width of one horizontal period (1H) during the initialization period INI. The pulse of the fourth scan signal SC4 is generated with a pulse width of three horizontal periods (3H) during the initialization period INI and the sensing period SEN.

The EM signal EM includes a pulse of the gate-off voltage VGL. The pulse of the EM signal EM is generated with a pulse width of three horizontal periods (3H) during the sensing period SEN and the data writing period WR.

FIGS. 5A to 8B are diagrams illustrating operations of the pixel circuit shown in FIG. 3 in stages.

Figure 5A:
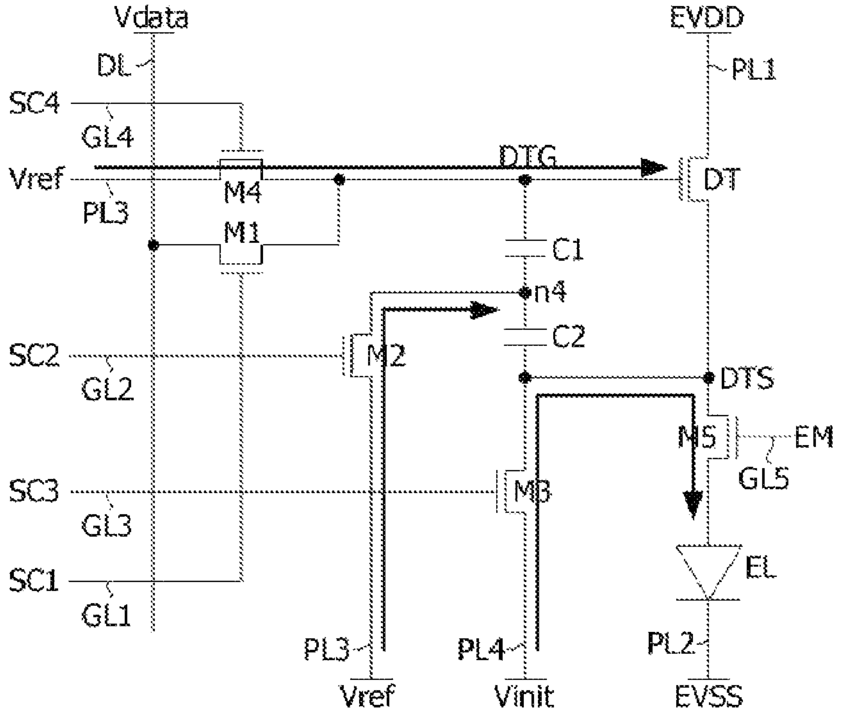
FIGS. 5A, 5B, 6A, 6B, 7A, 7B, 8A and 8B are diagrams illustrating operations of the pixel circuit shown in FIG. 3 in stages.
Figure 5B:
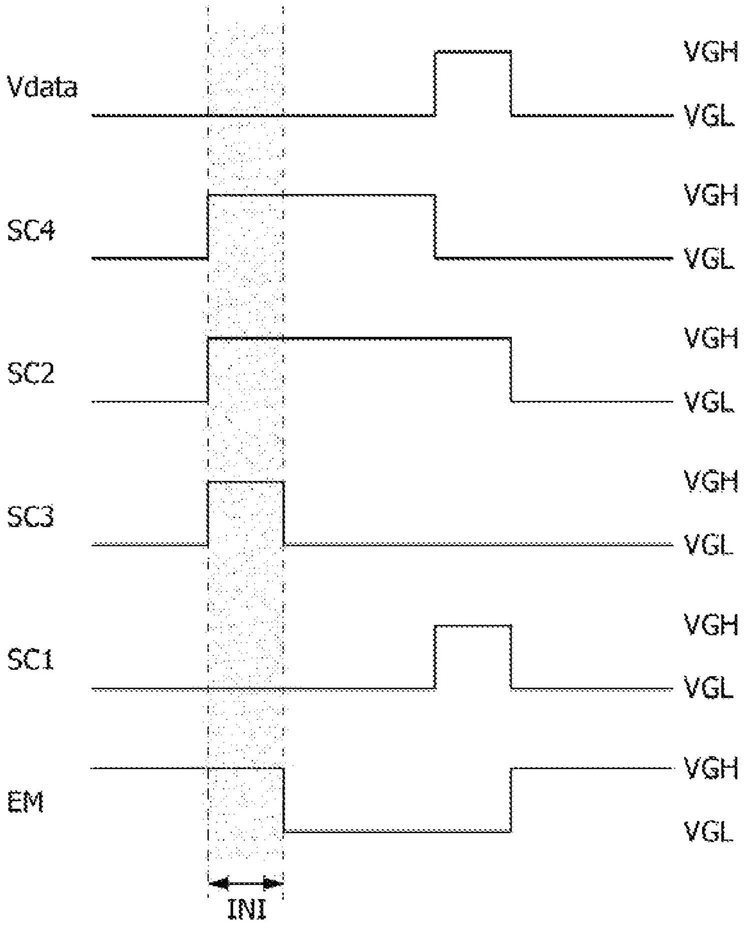

FIG. 5A is a circuit diagram illustrating a current flowing through the pixel circuit shown in FIG. 3 during the initialization period INI. FIG. 5B is a waveform diagram illustrating gate signals applied to the pixel circuit shown in FIG. 3 during the initialization period INI.

Referring to FIGS. 5A and 5B, during the initialization period INI, the voltage of the second, third, and fourth scan signals SC2, SC3, and SC4 and the EM signal EM is a gate-on voltage VGH, and the voltage of the first scan signal SC1 is a gate-off voltage VGL. During the initialization period INI, the second to fifth switch elements M2, M3, M4, and M5 are turned on, and the first switch element M1 is turned off. During the initialization period INI, the reference voltage Vref is applied to the second node DTG, and the initialization voltage Vinit is applied to the third node DTS and the anode electrode of the light emitting element EL. At the end of the initialization period INI, the voltage of the second node DTG is the reference voltage Vref and the voltage of the third node DTS is the initialization voltage Vinit. Therefore, the gate-source voltage Vgs of the driving element DT that is set during the initialization period INI is Vref−Vinit. At the end of the initialization period INI, the voltage of the first capacitor C1 is 0 [V], and the voltage of the second capacitor C2 is Vref−Vinit.

Figure 6A:
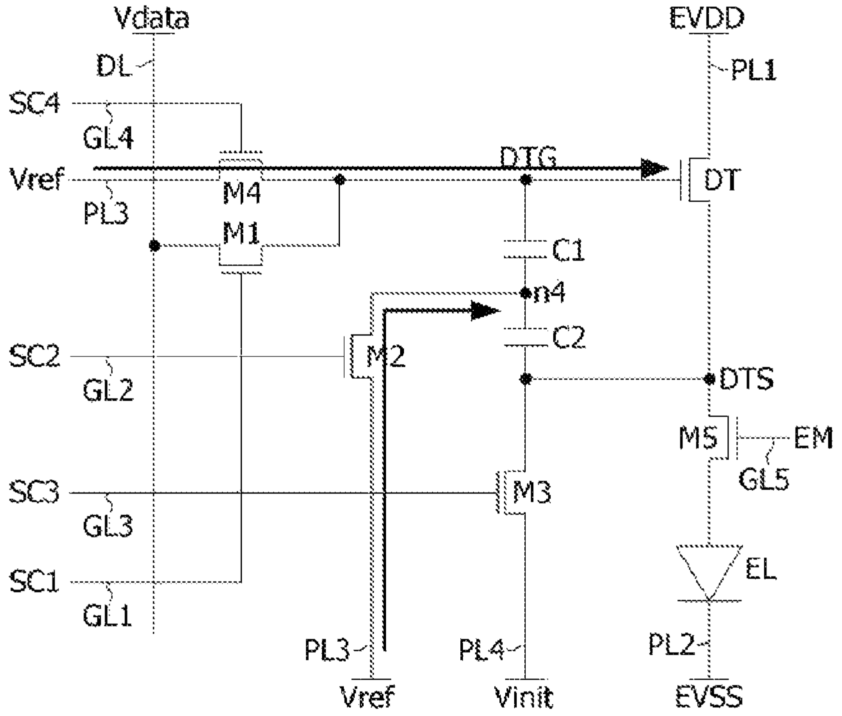
Figure 6B:
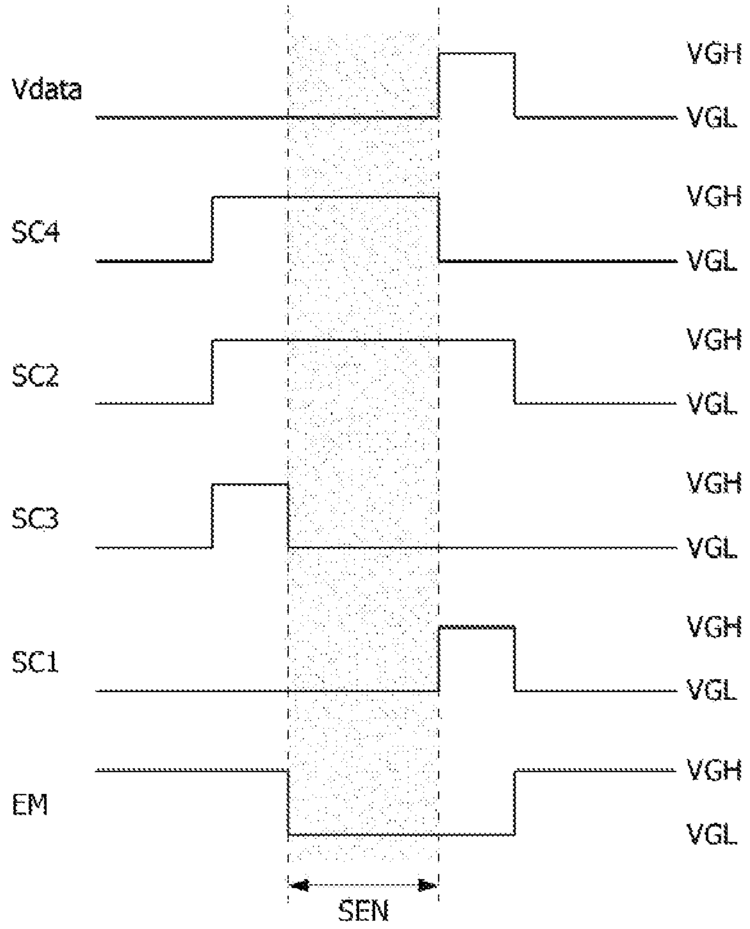

FIG. 6A is a circuit diagram illustrating a current flowing through the pixel circuit shown in FIG. 3 during the sensing period SEN. FIG. 6B is a waveform diagram illustrating the gate signals applied to the pixel circuit shown in FIG. 3 during the sensing period SEN.

Referring to FIGS. 6A and 6B, the voltage of the second and fourth scan signals SC2 and SC4 during the sensing period SEN is the gate-on voltage VGH. During the sensing period SEN, the voltage of the first and third scan signals SC1 and SC3 and the EM signal EM are gate-off voltages VGL. During the sense period SEN, the second and fourth switch elements M2 and M4 maintain the ON state. During the sensing period SEN, the first, third, and fifth switch elements M1, M3, and M5 are in an OFF state. During the sensing period SEN, the reference voltage Vref is applied to the second node DTG. During the sense period SEN, the voltage of the third node DTS increases, which decreases the gate-source voltage Vgs of the driving element DT. While the reference voltage Vref is applied to the second node DTG, the threshold voltage Vth of the driving element DT is sensed at the third node DTS. During the sensing period SEN, the driving element DT is turned off when the gate-source voltage Vgs of the driving element DT reaches the threshold voltage Vth of the driving element DT, and the threshold voltage Vth of the driving element DT is stored in the second capacitor C2. At the end of the sensing period SEN, since the voltage of the second node DTG is the reference voltage Vref and the voltage of the third node DTS is Vref−Vth, the gate-source voltage Vgs of the driving element DT is the threshold voltage Vth of the driving element DT. At the end of the sensing period SEN, the voltage of the first capacitor C1 is 0[V], and the voltage of the second capacitor C2 is the threshold voltage Vth of the driving element DT.

Figure 7A:
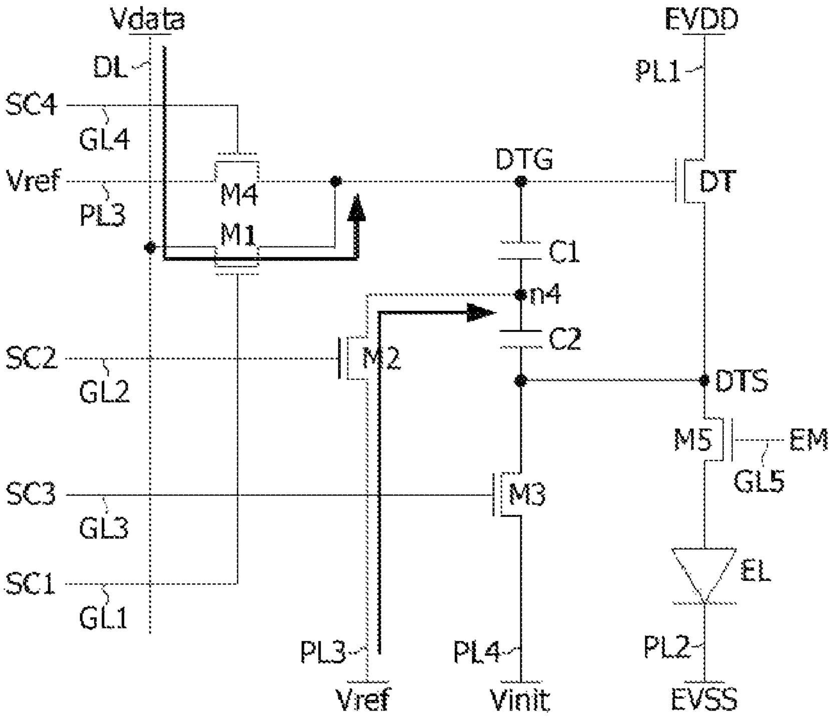
Figure 7B:
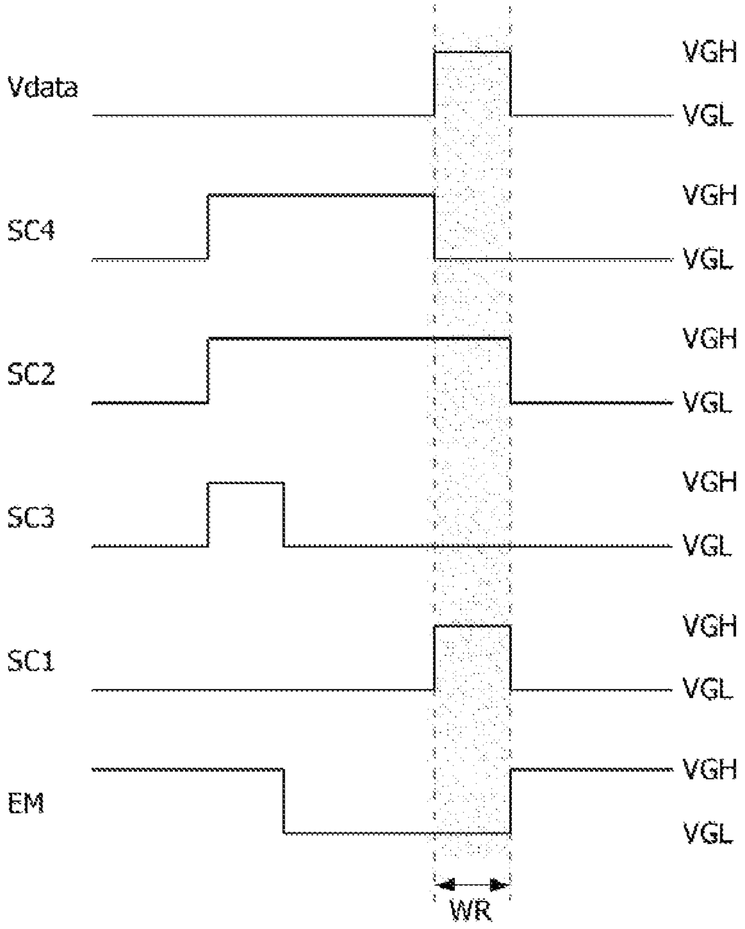

FIG. 7A is a circuit diagram illustrating a current flowing through the pixel circuit shown in FIG. 3 during the data writing period WR. FIG. 7B is a waveform diagram illustrating gate signals applied to the pixel circuit of FIG. 3 during the data writing period WR.

Referring to FIGS. 7A and 7B, the pulse of the first scan signal SC1 synchronized with the data voltage Vdata is generated during the data writing period WR. During the data writing period WR, the second scan signal SC2 is inverted to the gate-on voltage VGH and the fourth scan signal SC4 is inverted to the gate-off voltage VGL. The voltages of the third scan signal SC3 and the EM signal EM maintain the gate-off voltage VGL during the data writing period WR. During the data writing period WR, the first and second switch elements M1 and M2 are turned on. During the data writing period WR, the third, fourth, and fifth switch elements M3, M4, and M5 are in the OFF state. During the data writing period WR, the data voltage Vdata is applied to the second node DTG and the reference voltage Vref is applied to the fourth node n4. Due to the reference voltage Vref applied to the fourth node n4, the data voltage Vdata is not transmitted to the third node DTS during the data writing period WR and thus there is no transmission loss of the data voltage Vdata. At the end of the data writing period WR, the voltage of the second node DTG is the data voltage Vdata and the voltage of the third node DTS is Vref−Vth, so that the gate-source voltage Vgs of the driving element DT is Vdata−(Vref−Vth). At the end of the data writing period WR, the voltage of the first capacitor C1 is Vdata−Vref and the voltage of the second capacitor C2 is the threshold voltage Vth of the driving element DT.

Figure 8A:
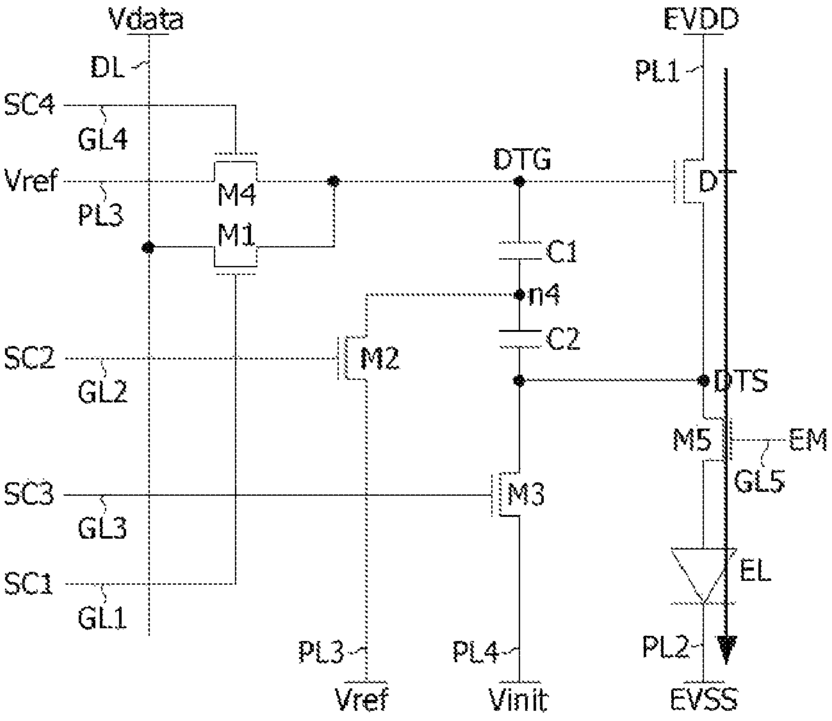
Figure 8B:
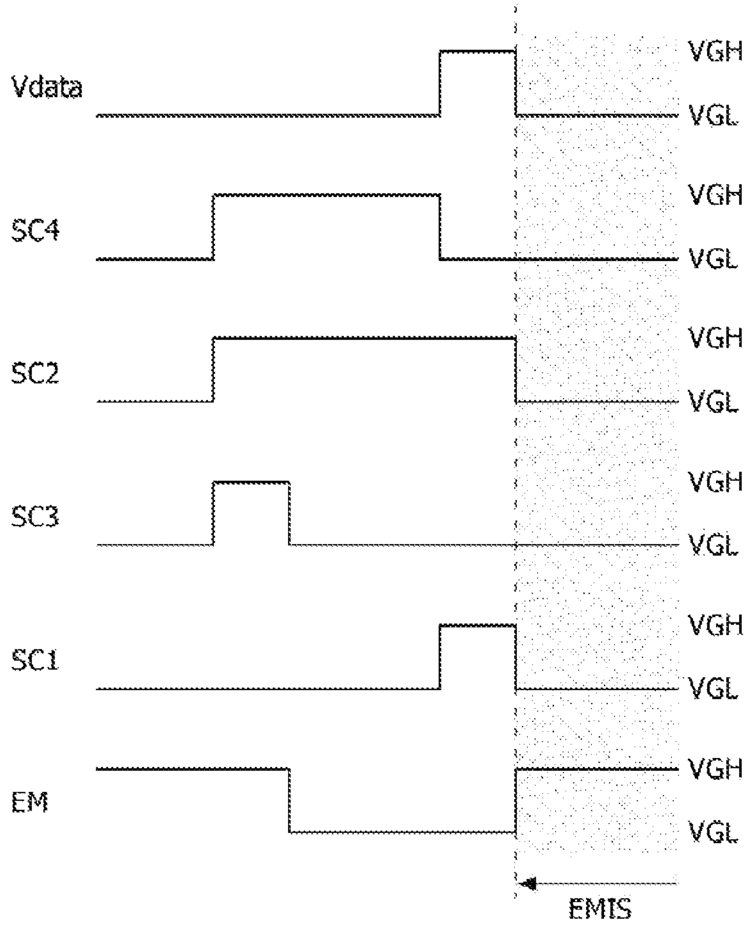

FIG. 8A is a circuit diagram illustrating a current flowing through the pixel circuit shown in FIG. 3 during the light emission period EMIS. FIG. 8B is a waveform diagram illustrating gate signals applied to the pixel circuit illustrated in FIG. 3 during the light emission period.

Referring to FIGS. 8A and 8B, during the light emission period EMIS, the EM signal EM is inverted to the gate-on voltage VGH, and the voltage of the scan signals SC1 to SC4 is the gate-off voltage VGL. During the light emission period EMIS, the fifth switch element M5 is turned on, while the other switch elements M1 to M4 are in the OFF state. During the light emission period EMIS, since no reference voltage Vref is applied to the fourth node n4, the threshold voltage Vth of the driving element DT stored in the second capacitor C2 is transmitted to the second node DTG. During the light emission period EMIS, the gate-source voltage Vgs of the driving element DT is Vdata−Vinit. During the light emission period EMIS, the driving element DT generates a current according to the gate-source voltage Vgs. The light emitting element EL may be emitted by the current supplied through the driving element DT during the light emission period EMIS. At the end of the light emission period EMIS, the voltage of the second node DTG is Vdata+Voled and the voltage of the third node DTS is Vref−Vth+Voled, so that the gate-source voltage Vgs of the driving element DT is Vdata−(Vref−Vth). At the end of the light emission period EMIS, the voltage of the first capacitor C1 is Vdata−Vref, and the voltage of the second capacitor C2 is the threshold voltage Vth of the driving element DT.

Figure 9:
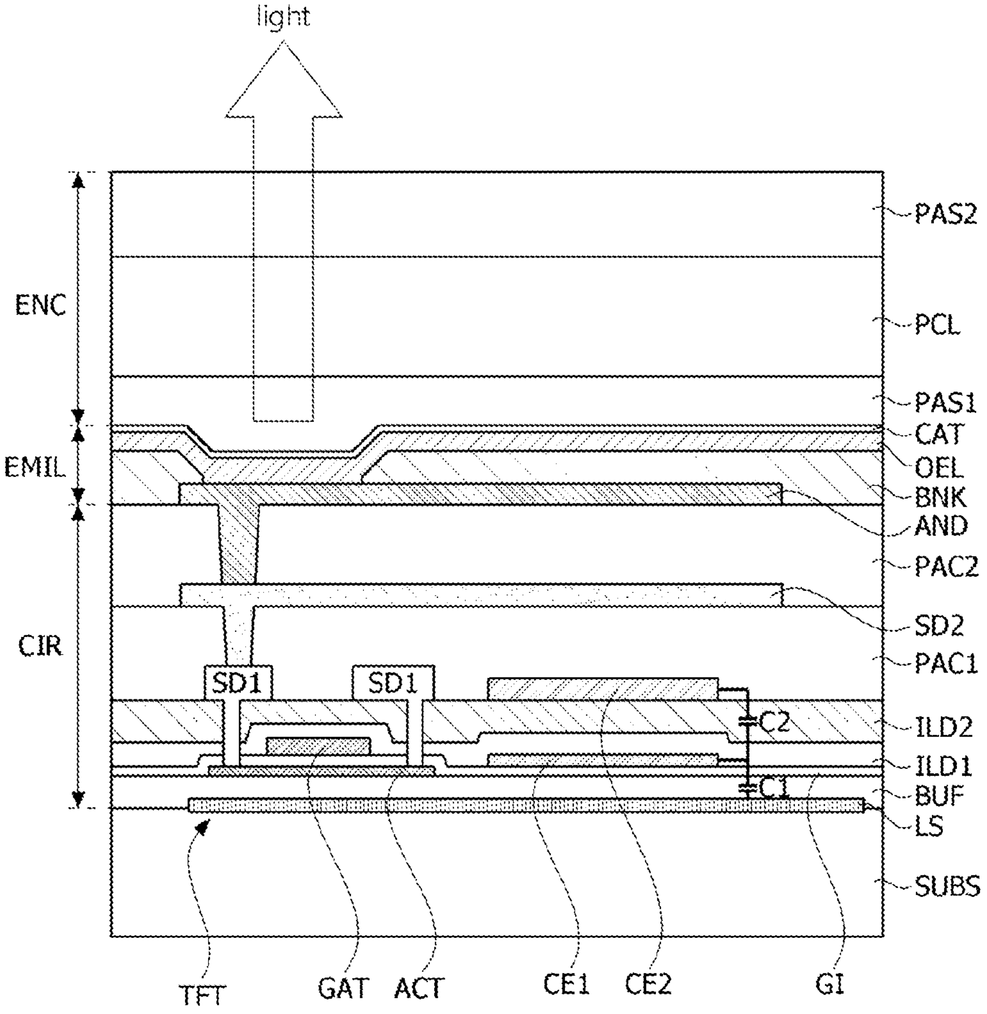
FIG. 9 is a view illustrating in detail a cross-sectional structure of a display panel.

FIG. 9 is a view illustrating in detail a cross-sectional structure of the display panel 100.

Referring to FIG. 9, a circuit layer CIR includes a first metal pattern LS disposed on the substrate SUB, a first insulating layer BUF disposed on the substrate SUB to cover a first metal pattern LS, and an oxide semiconductor pattern ACT disposed on the first insulating layer BUF. The driving element DT and the switch elements M1 to M5 of the pixel circuit have substantially the same structure as a TFT formed on the circuit layer CIR. The TFT shown in FIG. 9 may be a fifth switch element M5.

The first metal pattern LS is disposed below the TFT and is integrated with the first electrode of the capacitor. A gate electrode of the driving element DT may contact the first metal pattern LS via a contact hole penetrating the insulating layers GI and BUF. The oxide semiconductor pattern ACT forms a source-drain channel of the TFT.

The circuit layer CIR includes a second insulating layer GI covering the oxide semiconductor pattern ACT and the first insulating layer BUF of the TFT, second metal patterns GAT and CE1 disposed on the second insulating layer GI, a third insulating layer ILD1 covering the second insulating layer GI and the second metal patterns GAT and CE1, a fourth insulating layer ILD2 covering the third insulating layer ILD1, third metal patterns SD1 and CE2 disposed on the fourth insulating layer ILD2, a fifth insulating layer PAC1 covering the third metal pattern and the fourth insulating layer ILD2, a fifth metal pattern SD2 disposed on the fifth insulating layer PAC1, and a sixth insulating layer PAC2 covering the fifth metal pattern SD2 and the fifth insulating layer PAC1.

The first to fourth insulating layers BUF1, GI, ILD1, and ILD2 may be inorganic insulating layers comprising an oxide film or a nitride film. The fifth and sixth insulating layers PAC1 and PAC2 may be organic insulating layers.

The second metal patterns GAT and CE1 includes a gate electrode GAT of the TFT and a second electrode CE1 of a capacitor. The gate electrode GAT of the TFT overlaps the oxide semiconductor pattern ACT with the second insulating layer GI therebetween. The second electrode CE1 of the capacitor overlaps the first metal pattern LS with the first and second insulating layers BUF and GI therebetween. A first capacitor C1 is formed between the first metal pattern LS and the second electrode CE1 of the capacitor.

The third metal pattern SD1 and CE2 includes first and second electrodes of the TFT and the third electrode CE2 of the capacitor. A first electrode of the TFT is in contacted with an upper surface of one side of the oxide semiconductor pattern ACT via a contact hole penetrating the second to fourth insulating layers GI, ILD1 and ILD2. A second electrode of the TFT is in contact with an upper surface of the other side of the oxide semiconductor pattern ACT via another contact hole penetrating the second to fourth insulating layers GI, ILD1, and ILD2. The third electrode CE2 of the capacitor overlaps the second electrode CE1 with the third and fourth insulating layers ILD1 and ILD2 therebetween. A second capacitor C2 is formed between the second electrode CE1 and the third electrode CE2 of the capacitor.

The fifth metal pattern SD2 may be connected to the first electrode or the second electrode of the TFT via a contact hole penetrating the fifth insulating layer PAC1.

A light emitting element layer EMIL includes an anode electrode AND disposed on the sixth insulating layer PAC2, a bank pattern BNK disposed on the sixth insulating layer PAC2 and covering the anode electrode AND except the light emitting region of the sub-pixel, an organic compound layer OEL of the light emitting element disposed on the light emitting region and the bank pattern BNK, and a cathode electrode CAT disposed on the organic compound layer OEL. The bank pattern BNK may be a seventh insulating layer formed as an organic insulating layer. The anode electrode AND is in contact with the fifth metal pattern SD2 through a contact hole penetrating the sixth insulating layer PAC2.

An encapsulation layer ENC includes multiple insulating layers covering the cathode electrode CAT of the light emitting element EL. The multiple insulating layers include an eighth insulating layer PAS1 covering the cathode electrode CAT, a ninth insulating layer PCL covering the eighth insulating layer PAS1, and a tenth insulating layer PAS2 covering the ninth insulating layer PCL. The eighth and tenth insulating layers PAS1 and PAS2 may be inorganic insulating layers, and the ninth insulating layer PCL may be an organic insulating layer.

Figure 10:
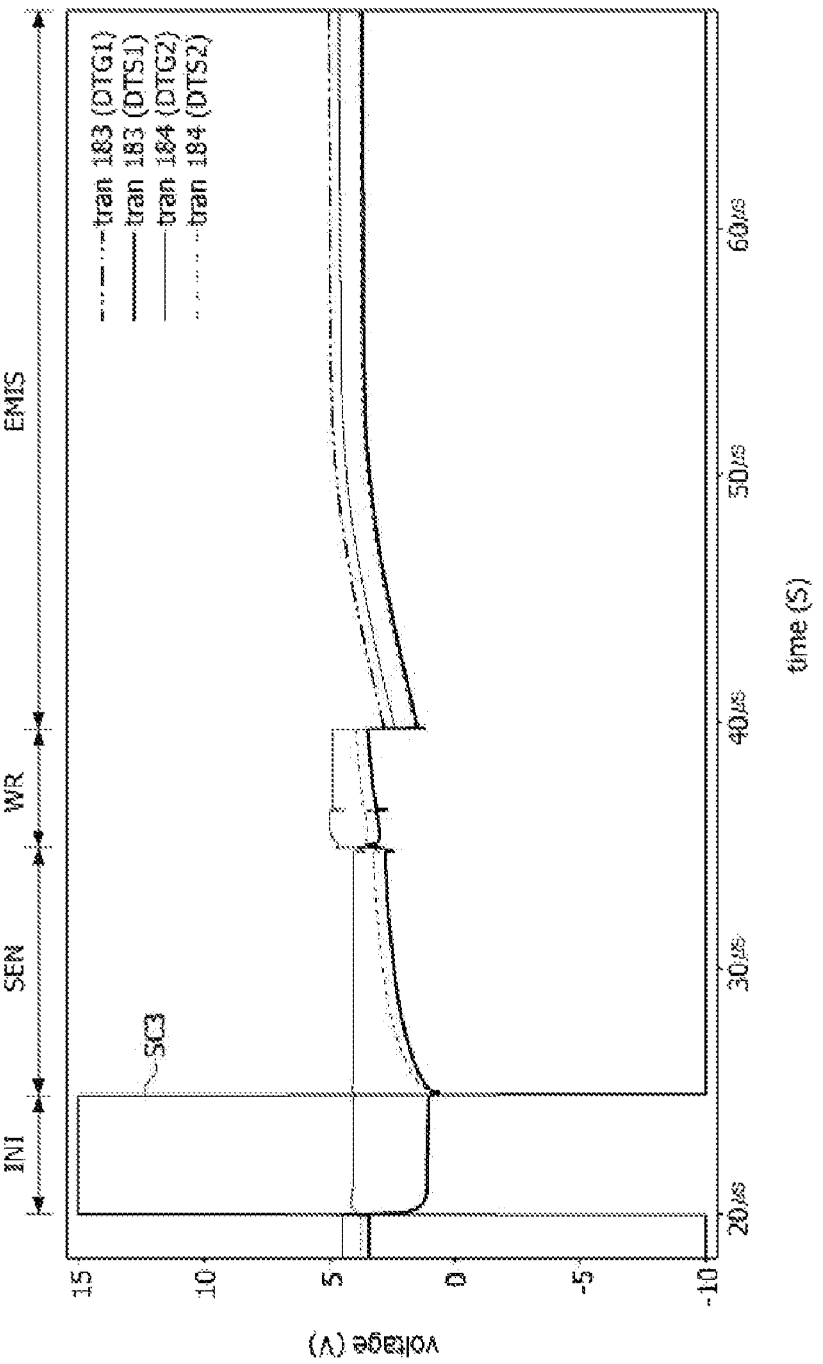
FIG. 10 shows simulation results for verifying the performance of the pixel circuit shown in FIG. 3.

FIG. 10 shows simulation results for verifying the performance of the pixel circuit shown in FIG. 3. From this simulation, the inventors have confirmed the effect of sensing the threshold voltage Vth by changing the threshold voltage Vth of the driving element DT by 0.5 [V] in the pixel circuit shown in FIG. 3. In FIG. 10, "tran 183 (DTG1)" and "tran 184 (DTG2)" are the voltages of the second node DTG with a difference of 0.5 [V], and "tran 183 (DTS1)" and "tran 184 (DTS2)" are the voltages of the third node DTS. From the results of the simulation, the inventors have confirmed that there is no transmission loss of the data voltage in the pixel circuit shown in FIG. 3 and that the performance of sensing the threshold voltage of the driving element DT is satisfactory.

Figure 11:
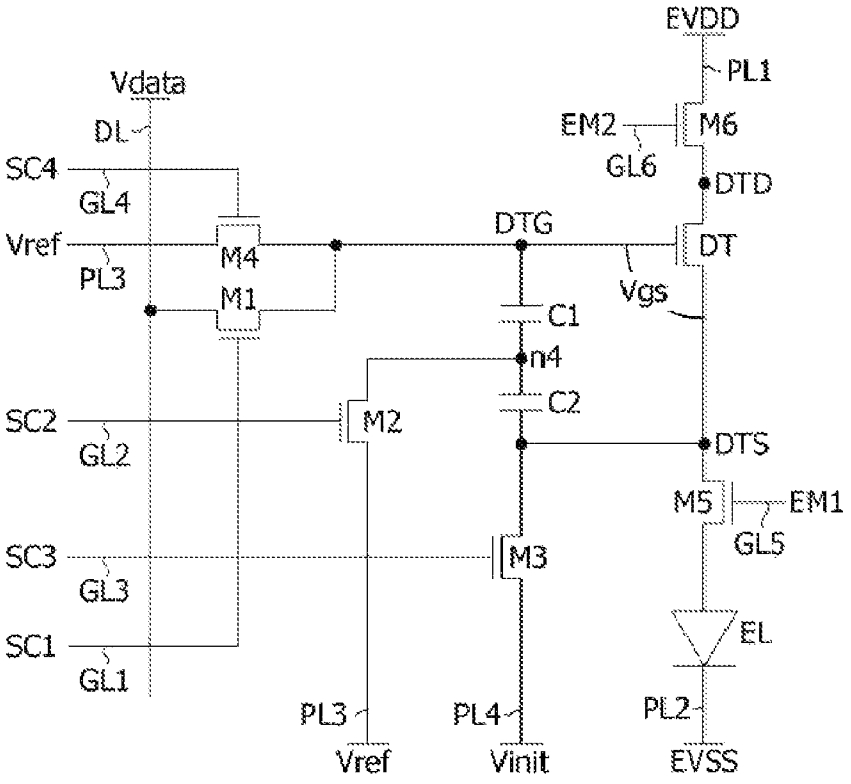
FIG. 11 is a circuit diagram illustrating a pixel circuit in accordance with another embodiment of the present disclosure.
Figure 12:
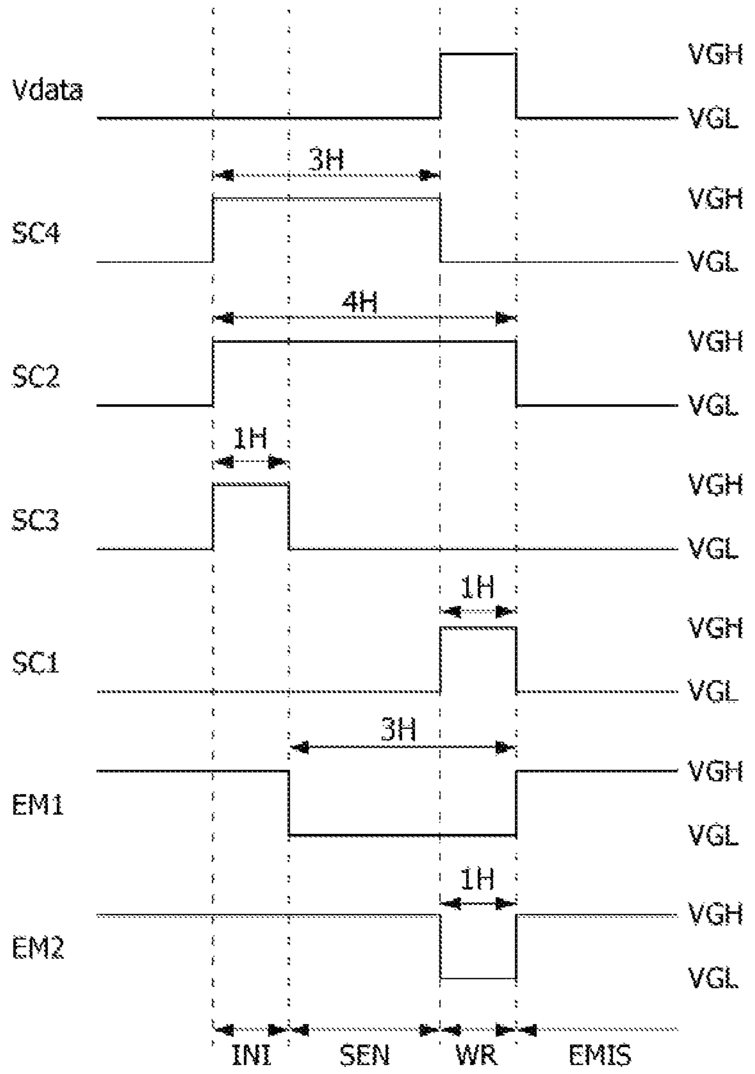
FIG. 12 is a waveform diagram illustrating gate signals applied to the pixel circuit shown in FIG. 11.

FIG. 11 is a circuit diagram illustrating a pixel circuit in accordance with another embodiment of the present disclosure. FIG. 12 is a waveform diagram illustrating gate signals applied to the pixel circuit shown in FIG. 11. In this embodiment, components that are substantially the same as the aforementioned components are designated with the same reference numerals and a detailed description thereof is omitted.

Referring to FIGS. 11 and 12, the pixel circuit includes an emitting element EL, a driving element DT driving the emitting element EL, a plurality of switch elements M1 to M6, a first capacitor C1, and a second capacitor C2. The driving element DT and each of the switch elements M1 to M5 may be implemented as n-channel oxide TFTs.

The pixel circuit is connected to a data line DL to which a data voltage Vdata of pixel data is applied, and to gate lines GL1 to GL5 to which gate signals SC1 to SC4, and EM are applied.

The pixel circuit is connected to power nodes to which a constant voltage is applied, such as a first constant voltage node PL1 to which a pixel driving voltage EVDD is applied, a second constant voltage node PL2 to which a cathode voltage EVSS is applied, a third constant voltage node PL3 to which a reference voltage Vref is applied, and a fourth constant voltage node PL4 to which an initialization voltage Vinit is applied. On the display panel 100, the power lines to which the constant voltage nodes are connected may be commonly connected to all pixels.

It is not required that each of the first, second, third and fourth voltages be constant at all times. In various embodiments, they might each be constant value at all times or just for a selected period of time and then change to a different DC value at a different time in the circuit operation. In some embodiments, one of more of them might respectively have different values at different times.

The pixel driving voltage EVDD and the cathode voltage EVDD are set to a voltage which enables the driving element DT to operate in a saturation region. The reference voltage Vref may be set to a voltage lower than the pixel driving voltage EVDD and higher than the cathode voltage EVSS. The reference voltage Vref may be a voltage that is higher than the lowest grayscale voltage or black grayscale voltage in a dynamic range of the data voltage. The initialization voltage Vinit may be set to a voltage lower than the cathode voltage EVSS. A gate-on voltage VGH may be set to a voltage higher than the pixel driving voltage EVDD, and a gate-off voltages VGL may be set to a voltage lower than the cathode voltage EVSS.

The gate signals SC1 to SC4, EM1, and EM2 include pulses that swing between the gate-on voltage VGH and the gate-off voltage VGL. For the pixel circuit shown in FIG. 11, the gate driver 120 may include a first shift register that outputs a first scan signal SC1, a second shift register that outputs a second scan signal SC2, a third shift register that outputs a third scan signal SC3, a fourth shift register that outputs a fourth scan signal SC4, a fifth shift register that outputs a first EM signal EM1, and a sixth shift register that outputs a second EM signal EM2.

A duration of each of the initialization period INI, the sensing period SEN, the data writing period WR, and the light emission period EMIS may be determined by waveforms of the gate signals SC1 to SC4, EM1, and EM2.

Each of the first to fourth scan signals SC1 to SC4 includes a pulse of the gate-on voltage VGH. The pulse of the first scan signal SC1 is generated with a pulse width of one horizontal period (1H) during the data writing period WR. The pulse of the second scan signal SC2 is generated with a pulse width of four horizontal periods (4H) during the initialization period INI to the data writing period WR. The pulse of the third scan signal SC3 is generated with a pulse width of one horizontal period (1H) during the initialization period INI. The pulse of the fourth scan signal SC4 is generated with a pulse width of three horizontal periods (3H) during the initialization period INI and the sensing period SEN.

The first and second EM signals EM1 and EM2 include a pulse of the gate-off voltage VGL. The pulse of the first EM signal EM1 is generated with a pulse width of three horizontal periods (3H) during the sensing period SEN and the data writing period WR. A voltage of the first EM signal EM1 is the gate-on voltage VGH during the initialization period INI and the light emission period EMIS, and the gate-off voltage VGL during the sensing period SEN and the data writing period WR.

The pulse of the second EM signal EM2 is generated with a pulse width of one horizontal period (1H) during the data writing period WR. A voltage of the second EM signal EM2 is the gate-on voltage VGH during the initialization period INI, the sensing period SEN, and the light emission period EMIS, and the gate-off voltage VGL during the data writing period WR. A mobility of the driving element DT may be sensed and compensated by the second EM signal EM2 during the data writing period WR, and a luminance of the pixels may be adjusted by using the PWM (pulse width modulation) pulse of the second EM signal EM2 during the light emission period EMIS, thereby improving the capability of low-grayscale expression.

The driving element DT generates a current according to a gate-source voltage Vgs to drive the light emitting element EL. The driving element DT includes a first electrode connected to a first node DTD, a gate electrode connected to a second node DTG, and a second electrode connected to a third node DTS.

A first switch element M1 is turned on in response to the gate-on voltage VGH of the first scan signal SC1 during the data writing period WR to connect the data line DL to the second node DTG. The first switch element M1 is in the OFF state during the initialization period INI, the sensing period SEN, and the light emission period EMIS. The first switch element M1 includes a gate electrode connected to a first gate line GL1 to which the first scan signal SC1 is applied, a first electrode connected to the data line DL, and a second electrode connected to the second node DTG.

A second switch element M2 is turned on in response to the gate-on voltage VGH of the second scan signal SC2 during the initialization period INI, the sensing period SEN, and the data writing period WR to connect the third constant voltage node PL3, to which the reference voltage Vref is applied, to a fourth node n4. The second switch element M2 is in the OFF state during the light emission period EMIS. The second switch element M2 includes a gate electrode connected to a second gate line GL2 to which the second scan signal SC2 is applied, a first electrode connected to the third constant voltage node PL3, and a second electrode connected to the fourth node n4.

A third switch element M3 is turned on in response to the gate-on voltage VGH of the third scan signal SC3 during the initialization period INI to connect the fourth constant voltage node PL4, to which the initialization voltage Vinit is applied, to the third node DTS. The third switch element M3 is in the OFF state during the sensing period SEN, the data writing period WR, and the light emission period EMIS. The third switch element M3 includes a gate electrode connected to a third gate line GL3 to which the third scan signal SC3 is applied, a first electrode connected to the fourth constant voltage node PL4, and a second electrode connected to the third node DTS.

The fourth switch element M4 is turned on in response to the gate-on voltage VGH of the fourth scan signal SC4 during the initialization period INI and the sensing period SEN to connect the third constant voltage node PL3 to the second node DTG. A fourth switch element M4 is in the OFF state during the data writing period WR and the light emission period EMIS. The fourth switch element M4 includes a gate electrode connected to a fourth gate line GL4 to which the fourth scan signal SC4 is applied, a first electrode connected to the third constant voltage node PL3, and a second electrode connected to the second node DTG.

A fifth switch element M5 is turned on in response to the gate-on voltage VGH of the first EM signal EM1 during the initialization period INI and the light emission period EMIS to connect the third node DTS to an anode electrode of the light emitting element EL. The fifth switch element M5 is in the OFF state during the sensing period SEN and the data writing period WR. The fifth switch element M5 includes a gate electrode connected to a fifth gate line GL5 to which the first EM signal EM1 is applied, a first electrode connected to the third node DTS, and a second electrode connected to the anode electrode of the light emitting element EL.

A sixth switch element M6 is turned on in response to the gate-on voltage VGH of the second EM signal EM2 during the initialization period INI, the sensing period SEN, and the light emission period EMIS to supply the pixel driving voltage EVDD to the first node DTD. The sixth switch element M6 is in the OFF state during the data writing period WR. The sixth switch element M6 includes a gate electrode connected to a sixth gate line GL6 to which the second EM signal EM2 is applied, a first electrode connected to the first constant voltage node PL1 to which the pixel driving voltage EVDD is applied, and a second electrode connected to the first node DTD.

During the initialization period INI, the voltage of the second, third, and fourth scan signals SC2, SC3, and SC4 and the first and second EM signals EM1 and EM2 is the gate-on voltage VGH, and the voltage of the first scan signal SC1 is the gate-off voltage VGL. During the initialization period INI, the second to sixth switch elements M2 to M6 are turned on, and the first switch element M1 is turned off. During the initialization period INI, the pixel driving voltage EVDD is applied to the first node DTD and the reference voltage Vref is applied to the second node DTG. During the initialization period INI, the initialization voltage Vinit is applied to the third node DTS and the anode electrode of the light emitting element EL.

During the sensing period SEN, the voltages of the second and fourth scan signals SC2, SC4 and the second EM signal EM2 are the gate-on voltage VGH. During the sensing period SEN, the voltages of the first and third scan signals SC1 and SC3 and the first EM signal EM1 are the gate-off voltage VGL. During the sensing period SEN, the second, fourth, and sixth switch elements M2, M4, and M6 are in the ON state and the other switch elements M1, M3, and M5 are in the OFF state. During the sensing period SEN, the reference voltage Vref is applied to the second node DTG. During the sensing period SEN, the threshold voltage Vth of the driving element DT is sensed at the third node DTS, and the threshold voltage Vth of the driving element DT is stored in the second capacitor C2.

In the data writing period WR, the pulse of the first scan signal SC1 synchronized with the data voltage Vdata is generated. During the data writing period WR, the second scan signal SC2 is inverted to the gate-on voltage VGH and the fourth scan signal SC4 is inverted to the gate-off voltage VGL. The voltages of the third scan signal SC3 and the first EM signal EM1 maintain the gate-off voltage VGL during the data writing period WR, and the second EM signal EM2 is inverted to the gate-off voltage VGL. During the data writing period WR, the first and second switch elements M1 and M2 are turned on. During the data writing period WR, the third, fourth, fifth, and sixth switch elements M3, M4, M5, and M6 are in the OFF state. During the data writing period WR, the data voltage Vdata is applied to the second node DTG and the reference voltage Vref is applied to the fourth node n4. Due to the reference voltage Vref applied to the fourth node n4, the data voltage Vdata is not transmitted to the third node DTS during the data writing period WR, and thus there is no transmission loss of the data voltage Vdata. During the data writing period WR, the gate-source voltage Vgs of the driving element DT is (Vdata−Vinit)+Vth. During the data writing period WR, the voltage of the third node DTS changes according to the mobility μ of the driving element DT, so that the mobility of the driving element DT may be sensed and the change or deviation of the mobility may be compensated. For example, when the mobility of the driving element DT is large, the voltage of the third node DTS is increased during the data writing period WR to decrease the gate-source voltage Vgs of the driving element DT. On the other hand, when the mobility of the driving element DT is relatively small, the voltage of the third node DTS is reduced, which increases the gate-source voltage Vgs of the driving element DT.

In the light emission period EMIS, the voltages of the first and second EM signals EM1 and EM2 are inverted to the gate-on voltage VGH, and the voltages of the scan signals SC1 to SC4 are the gate-off voltage VGL. During the light emission period EMIS, the fifth and sixth switch elements M5 and M6 are turned on, while the other switch elements M1 to M4 are turned off. During the light emission period EMIS, since no reference voltage Vref is applied to the fourth node n4, the threshold voltage Vth of the driving element DT stored in the second capacitor C2 is transmitted to the second node DTG. During the light emission period EMIS, the gate-source voltage Vgs of the driving element DT is Vdata−Vinit. During the light emission period EMIS, the driving element DT generates a current according to the gate-source voltage Vgs. The light emitting element EL may be emitted by the current supplied through the driving element DT during the light emission period EMIS.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a driving element including a first electrode to which a pixel driving voltage is applied, a gate electrode connected to a second node, and a second electrode connected to a third node;

a light emitting element including an anode electrode and a cathode electrode connected to a second voltage node to which a cathode voltage is applied;

a first capacitor connected between the second node and a fourth node;

a second capacitor connected between the third node and the fourth node;

a first switch element connected between the second node and a data line to which a data voltage is applied;

a second switch element connected between the fourth node to which the first capacitor and the second capacitor are connected and a third voltage node to which a reference voltage is applied;

a third switch element connected between the third node and a fourth voltage node to which an initialization voltage is applied;

a fourth switch element connected between the second node and the third voltage node; and a fifth switch element connected between the third node and the anode electrode of the light emitting element, wherein the second switch element and fourth switch element are connected to be controlled by different scan signals.

2. The pixel circuit of claim 1, wherein the pixel driving voltage is higher than the cathode voltage, the reference voltage is lower than the pixel driving voltage and higher than the cathode voltage, and the initialization voltage is lower than the cathode voltage.

3. The pixel circuit of claim 1, wherein:

the first switch element is configured to connect the data line to the second node in response to a first scan signal, the second switch element is configured to connect the third voltage node to the fourth node in response to a second scan signal, the third switch element is configured to connect the fourth voltage node to the third node in response to a third scan signal, the fourth switch element is configured to connect the third voltage node to the second node in response to a fourth scan signal, and the fifth switch element is configured to connect the third node to the anode electrode of the light emitting element in response to an emission control signal.

4. The pixel circuit of claim 3, wherein the first switch element includes a gate electrode connected to a first gate line to which the first scan signal is applied, a first electrode connected to the data line, and a second electrode connected to the second node, the second switch element includes a gate electrode connected to a second gate line to which the second scan signal is applied, a first electrode connected to the third voltage node, and a second electrode connected to the fourth node, the third switch element includes a gate electrode connected to a third gate line to which the third scan signal is applied, a first electrode connected to the fourth voltage node, and a second electrode connected to the third node, the fourth switch element includes a gate electrode connected to a fourth gate line to which the fourth scan signal is applied, a first electrode connected to the third voltage node, and a second electrode connected to the second node, and the fifth switch element includes a gate electrode connected to a fifth gate line to which the emission control signal is applied, a first electrode connected to the third node, and a second electrode connected to the anode electrode of the light emitting element.

5. The pixel circuit of claim 3, wherein the pixel circuit is driven in the order of an initialization period, a sensing period, a data writing period, and a light emission period, a voltage of the first scan signal is a gate-on voltage during the data writing period, and a gate-off voltage during the initialization period, the sensing period, and the light emission period, a voltage of the second scan signal is the gate-on voltage during the initialization period, the sensing period, and the data writing period, and the gate-off voltage during the light emission period, a voltage of the third scan signal is the gate-on voltage during the initialization period and the gate-off voltage during the sensing period, the data writing period, and the light emission period, a voltage of the fourth scan signal is the gate-on voltage during the initialization period and the sensing period, and the gate-off voltage during the data writing period and the light emission period, a voltage of the emission control signal is the gate-on voltage during the initialization period and the light emission period, and the gate-off voltage during the sensing period and the data writing period, and each of the first to fifth switch elements is turned on in response to the gate-on voltage and turned off in response to the gate-off voltage.

6. The pixel circuit of claim 5, wherein during the initialization period, the second to fifth switch elements are in the ON state and the first switch element is in the OFF state, during the sensing period, the second and fourth switch elements are in the ON state and the first, third, and fifth switch elements are in the OFF state, during the data writing period, the first and second switch elements are in the ON state and the third, fourth, and fifth switch elements are in the OFF state, and during the light emitting period, the fifth switch element is in the ON state and the first to fourth switch elements are in the OFF state.

7. The pixel circuit of claim 3, further comprising:

a sixth switch element configured to connect the pixel driving voltage to a first node in response to a second emission control signal, wherein the first electrode of the driving element is connected to the first node.

8. The pixel circuit of claim 7, wherein the sixth switch element includes a gate electrode connected to a sixth gate line to which the second emission control signal is applied, a first electrode connected to the first voltage node to which the pixel driving voltage is applied, and a second electrode connected to the first node.

9. The pixel circuit of claim 7, wherein the pixel circuit is driven in the order of an initialization period, a sensing period, a data writing period, and a light emission period, a voltage of the first scan signal is a gate-on voltage during the data writing period, and a gate-off voltage during the initialization period, the sensing period, and the light emission period, a voltage of the second scan signal is the gate-on voltage during the initialization period, the sensing period, and the data writing period, and the gate-off voltage during the light emission period, a voltage of the third scan signal is the gate-on voltage during the initialization period and the gate-off voltage during the sensing period, the data writing period, and the light emission period, a voltage of the fourth scan signal is the gate-on voltage during the initialization period and the sensing period, and the gate-off voltage during the data writing period and the light emission period, a voltage of the emission control signal is the gate-on voltage during the initialization period and the light emission period, and the gate-off voltage during the sensing period and the data writing period, a voltage of the second emission control signal is the gate-on voltage during the initialization period, the sensing period, and the light emission period, and the gate-off voltage during the data writing period, and each of the first to sixth switch elements is turned on in response to the gate-on voltage, and turned off in response to the gate-off voltage.

10. The pixel circuit of claim 9, wherein during the initialization period, the second to sixth switch elements are in the ON state and the first switch element is in the OFF state, during the sensing period, the second, fourth, and sixth switch elements are in the ON state and the first, third, and fifth switch elements are in the OFF state, during the data writing period, the first and second switch elements are in the ON state and the third, fourth, fifth, and sixth switch elements are in the OFF state, and during the light emission period, the fifth and sixth switch elements are in the ON state and the first to fourth switch elements are in the OFF state.

11. The display device of claim 1 wherein each of the second, third and fourth voltages are constant voltages.

12. The display device of claim 1 wherein each of second, third and fourth voltages are capable of having respectively have different values at different respective times.

13. A display device comprising:

a display panel in which a plurality of data lines, a plurality of gate lines, a plurality of power lines, and a plurality of sub-pixels are disposed;

a gate driver configured to supply gate signals to the gate lines; and a data driver configured to supply a data voltage of pixel data to the data lines, wherein the gate signals includes:

a first scan signal, a second scan signal, a third scan signal, a fourth scan signal, and an emission control signal, and wherein each of the sub-pixels includes:

a driving element including a first electrode to which a pixel driving voltage is applied, a gate electrode connected to a second node, and a second electrode connected to a third node;

a light emitting element including an anode electrode and a cathode electrode connected to a second voltage node to which a cathode voltage is applied;

a first capacitor connected between the second node and a fourth node;

a second capacitor connected between the third node and the fourth node;

a first switch element connected between the second node and the data line to which the data voltage is applied;

a second switch element connected between the fourth node to which the first capacitor and the second capacitor are connected and a third voltage node to which a reference voltage is applied;

a third switch element connected between the third node and a fourth voltage node to which an initialization voltage is applied;

a fourth switch element connected between the second node and the third voltage node; and a fifth switch element connected between the third node and the anode electrode of the light emitting element, wherein the second switch element and fourth switch element are connected to be controlled by different scan signals.

14. The display device of claim 13, wherein:

the first switch element is configured to connect the data line to the second node in response to a first scan signal, the second switch element is configured to connect the third voltage node to the fourth node in response to a second scan signal, the third switch element is configured to connect the fourth voltage node to the third node in response to a third scan signal, the fourth switch element is configured to connect the third voltage node to the second node in response to a fourth scan signal, and the fifth switch element is configured to connect the third node to the anode electrode of the light emitting element in response to an emission control signal.

15. The display device of claim 14, wherein each of the sub-pixels is driven in the order of an initialization period, a sensing period, a data writing period, and a light emission period;

a voltage of the first scan signal is a gate-on voltage during the data writing period, and a gate-off voltage during the initialization period, the sensing period, and the light emission period;

a voltage of the second scan signal is the gate-on voltage during the initialization period, the sensing period, and the data writing period, and the gate-off voltage during the light emission period;

a voltage of the third scan signal is the gate-on voltage during the initialization period and the gate-off voltage during the sensing period, the data writing period, and the light emission period;

a voltage of the fourth scan signal is the gate-on voltage during the initialization period and the sensing period, and the gate-off voltage during the data writing period and the light emission period;

a voltage of the emission control signal is the gate-on voltage during the initialization period and the light emission period, and the gate-off voltage during the sensing period and the data writing period; and each of the first to fifth switch elements is turned on in response to the gate-on voltage and turned off in response to the gate-off voltage.

16. The display device of claim 14, wherein each of the sub-pixels further includes:

a sixth switch element configured to connect the pixel driving voltage to a first node in response to a second emission control signal, wherein the first electrode of the driving element is connected to the first node.

17. The display device of claim 16, wherein each of the sub-pixels is driven in the order of an initialization period, a sensing period, a data writing period, and a light emission period;

a voltage of the first scan signal is a gate-on voltage during the data writing period, and a gate-off voltage during the initialization period, the sensing period, and the light emission period;

a voltage of the second scan signal is the gate-on voltage during the initialization period, the sensing period, and the data writing period, and the gate-off voltage during the light emission period;

a voltage of the third scan signal is the gate-on voltage during the initialization period and the gate-off voltage during the sensing period, the data writing period, and the light emission period;

a voltage of the fourth scan signal is the gate-on voltage during the initialization period and the sensing period, and the gate-off voltage during the data writing period and the light emission period;

a voltage of the emission control signal is the gate-on voltage during the initialization period and the light emission period, and the gate-off voltage during the sensing period and the data writing period;

a voltage of the second emission control signal is the gate-on voltage during the initialization period, the sensing period, and the light emission period, and the gate-off voltage during the data writing period; and each of the first to sixth switch elements is turned on in response to the gate-on voltage and turned off in response to the gate-off voltage.

18. The display device of claim 13, wherein during the data writing period, the second node is applied with the data voltage and the fourth node is applied with the reference voltage.

19. The display device of claim 13, wherein each of the second, third and fourth voltages are constant voltages.

20. The display device of claim 13, wherein each of second, third and fourth voltages are capable of having respectively different values at different respective times.

* * * * *